Jan. 31, 1961
G. L. BUTLER
2,969,922
LAWN SPRINKLER
Filed March 28, 1958
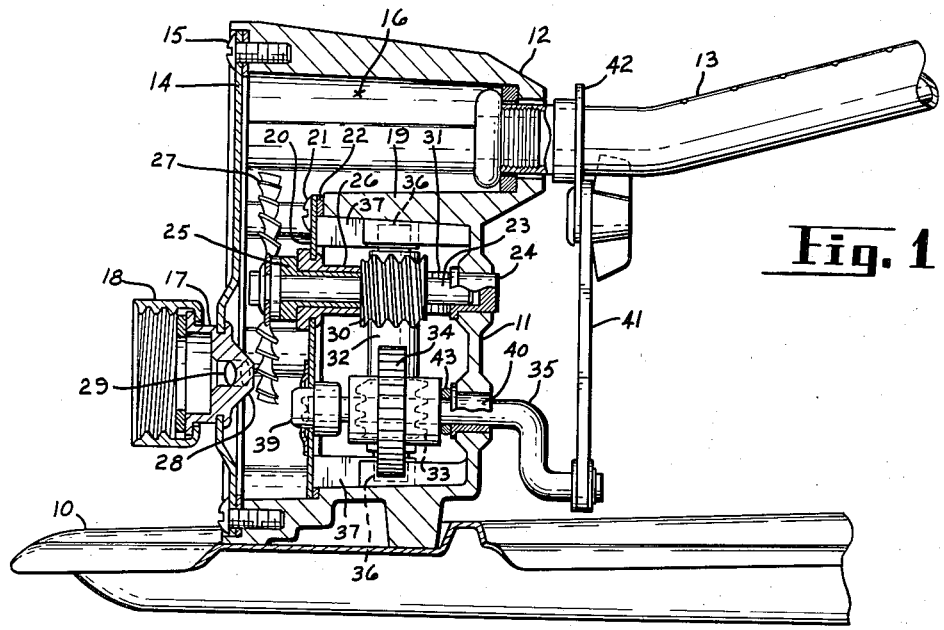
Fig. 1
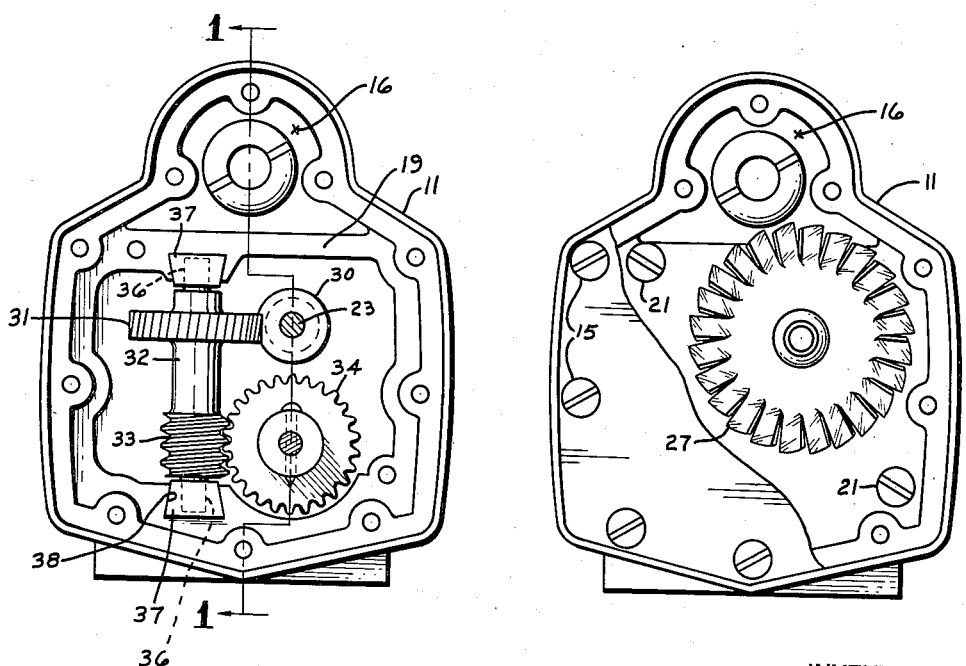
Fig. 2
Fig. 3
INVENTOR
Gray L. Butler
BY
H. F. Johnston
ATTORNEY

United States Patent Office 2,969,922
Patented Jan. 31, 1961

2,969,922

LAWN SPRINKLER

Gray L. Butler, Terryville, Conn., assignor, by mesne assignments, to Otto Bernz Company, Inc., Rochester, N.Y., a corporation of New York Filed Mar. 28, 1958, Ser. No. 724,583

4 Claims. (Cl. 239—242)

My invention is an improved water sprinkler and relates especially to sprinklers of the class where a water motor is employed to actuate the movable water discharge or nozzle member.

Water sprinklers of this class are employed usually for oscillating an elongated nozzle or discharge member and intended for sprinkling rectangular areas. Reduction gearing must be employed between the water motor and oscillating member which usually consists of two worm and gear sets. In practice, it has been found that gears made of metal will not have a satisfactory life in sprinklers and that if the gears are made of a suitable plastic material, such as nylon, they will last much longer; nylon gears are also somewhat cheaper.

Problems arising from the use of nylon gears and bearings in such sprinklers are due to the fact that the plastic material swells by absorption of water so that the interfitted parts will either bind, or if loose enough to prevent binding, excessive wear will take place because of improper contact between the gear teeth. Heretofore, such gearing has usually been arranged to operate in the same water chamber as the impeller. When the sprinkler is not in use, the water drains out and the plastic material of the gears and bearings dries out and shrinks so that the gearing must always be made loose enough so that it will not bind. Since it requires considerable time for the plastic parts to absorb the maximum amount of water, the gears will normally have to operate in a loose fashion, and therefore, wear out more quickly.

Attempts to put the gearing in a separate dry casing also have not been satisfactory. It is possible that leakage into such a chamber may occur requiring a drain hole. Some allowance must still be made for dimensional changes in the plastic gears and bearings. Also, in such an arrangement, the lubricating value of water for the gears is lost.

It is the object of my invention to overcome this difficulty by providing an arrangement whereby the gears will be continuously surrounded by water even during periods when the sprinkler is not in use. Means are provided whereby water is automatically admitted to the gear casing during the first use of the sprinkler but prevented from escaping therefrom afterwards. The inlet for such water is restricted in such a way that dirt is prevented from entering the gear chamber; this is another advantage of my invention.

Another problem encountered in sprinklers of this general type is due to galvanic corrosion which takes place in mineralized water between certain of the metal parts. The shaft carrying the impeller wheel and the worm mounted on the shaft are usually made of brass whereas the cover plate and casing are of a different metal. The plate may be stainless steel and the casing of aluminum.

According to my invention, these parts are prevented from coming into contact continuously with the fresh water and are confined in a small compartment permanently filled with the same water so that after a short time, such water becomes chemically inert and the galvanic action stopped. This tends to prolong the life of the sprinkler.

A further object is to accomplish these results with a construction which is economical to manufacture.

In the drawings:

Fig. 1 is a longitudinal sectional view of one end of an oscillatory sprinkler embodying my invention, the section taken along the line 1—1 of Fig. 2;

Fig. 2 is a left end view of the housing with the cover plates removed to show the interior construction; and Fig. 3 is a similar view to Fig. 2 but showing the gear casing cover plate in place and a portion only of the outer plate removed.

Referring now to the drawings and particularly to Fig. 1, the numeral 10 refers to a base on which is mounted a housing 11 having a projecting hub 12 at its upper end in which is pivotally mounted a distributor arm or nozzle 13 having a series of holes through which the water may be discharged.

The left open end of the casing 11 is closed by a cover plate 14 secured in place with screws 15 and defining with said housing a water chamber 16. Mounted in the plate 14 is a stud 17 supporting a swivel nut 18 for making the usual hose connection in the sprinkler.

Built within the housing 11 is a gear casing 19 having its open end closed off from the water chamber 16 by partition plate 20 attached to said casing by screws 21 with a gasket 22 interposed therebetween. The character of the gasket 22 and its function forms an important part of the invention and will be more fully explained later.

Mounted within the gear casing 19 is a drive shaft 23 having its inner end journalled in a cupped bushing 24 fitted into the rear wall of the housing and its opposite end journalled in and extending through a bearing hub 25 mounted in a bushing 26 secured to the cover plate 20. An impeller wheel 27 is fixed to the outer end of the shaft 23. The stud 17 mounted in the cover plate 14 is formed with a nozzle 28 projecting into the water chamber and is provided with suitable biased port 29 for directing water against the blades of the impeller wheel 27.

Within the gear casing 19 is a worm 30 preferably made of brass which is attached to the shaft 23 and meshing with a worm wheel 31 formed as an integral part of a spindle 32. A worm 33 is also formed on the opposite end of the spindle 32 and meshes with a worm wheel 34 pinned on a crank shaft 35. In order to pivotally mount the spindle 32 with its integral gears in a vertical position with the gear casing 19, the opposite ends of said spindle are formed with pintles 36 turning in bearings 37 which are in the form of elongated dovetailed blocks having a slidable loose fit into complementary dove-tailed grooves 38 provided in the upper and lower inner walls of the gear casing 19.

The spindle 32 with its integral gears and pintles, and the bearing blocks 37 as well as the gear 34, are preferably made of nylon material. This not only tends toward economy of manufacture but the nylon gears, especially when running in water, have a considerably longer life than the brass gears which were formerly employed. However, the worm 30 is preferably made of brass because otherwise, it would be difficult to affix the same tightly on the shaft 23. Since, however, this meshes with the nylon worm gear 31, it will not wear as fast as if it were meshed with a metal gear especially when continuously lubricated by the water.

The crank shaft 35 is journalled in nylon bearings 39 and 40 mounted respectively in the partition plate 20 and housing 11. The outer end of the crank shaft 35 is connected to one end of the pitman link 41 in turn connected to a lever 42 fixed to the distributor nozzle 13. From this linkage, it will be obvious that rotary motion imparted to the crank shaft 35 from the gear train in the gear casing and impeller wheel 27 will be transmitted into oscillatory motion for the distributor nozzle 13.

As pointed out above, the characteristic of the plastic parts to swell due to water absorption necessitates different initial dimensions of the several interfitted parts in normal practice. It has been determined that plastic material, such as nylon, when exposed to water, will swell approximately 7½% in a period of about two weeks. Because of this, all the nylon parts are initially made undersized so that after exposure to water for a period of time, the gears will be in proper intermeshed relationship and the bearings will have the proper fit for the rotating parts.

According to my invention, these enlarged dimensions of the parts are maintained after the initial period of exposure to water by keeping the nylon parts submerged in water at all times even during periods when the sprinkler is not operating. For this purpose, the gasket 22 between the gear casing 19 and the partition plate 20 is made of a fibrous material capable of swelling when exposed to water. One of the materials that has been found satisfactory for this gasket is "Vellumoid."

In order to permit water to enter into the gear casing 19 when the sprinkler is first put to use, the cover plate is not tightly attached through its entire perimeter to the open end of the gear box in that only two screws are used at diametrically opposite corners. The fact that the gasket is clamped only at widely spaced points when in a dry state will allow sufficient clearance between the unclamped portions of the cover plate to permit water passing through the water chamber 16 to leak into the gear casing, and when the gasket 22 swells, the water which has entered into said casing will be trapped to preserve the swelled state of the nylon parts even when the sprinkler is stored for long periods of time.

It will be observed that the shaft bushings 24 and 39 also made of nylon material, are cup-shaped to prevent any seepage of water therethrough even though the bearing recesses are initially made oversized. Also, to prevent any seepage past the nylon bearing 40 through which the crank shaft 35 passes, an O-ring 43 is positioned on said shaft between the flange of the bearing 40 and the hub of the gear 34.

From the above description, will now be apparent that my improved sprinkler, particularly in respect to the gearing and shafts for transmitting movement from the impeller wheel to the nozzle, consists of parts which can be economically manufactured and assembled. Since these parts are at all times, even when the sprinkler is not in use, substantially immersed in water, the plastic material of the gears and bearings will remain, after an initial period of use, of the proper dimensions so that the parts will fit nicely together and excessive wear is avoided.

Furthermore, it will be apparent that the problem of corrosion due to galvanic action is solved as a practical matter since the water in the small compartment surrounding the shafts and gears becomes chemically inert after an initial period of use.

I claim:
1. In a water sprinkler, a movable water discharge nozzle member, a water chamber communicating with said nozzle member, an impeller wheel mounted in said chamber, water inlet means to said chamber including a nozzle to direct the incoming water against said impeller wheel, means for transmitting motion from said wheel to said nozzle member including reduction gearing in which at least part of the gears are of plastic material, a hollow gear casing enclosing said gears including a partition plate between said water chamber and gear casing, and a gasket between said plate and gear casing at least a portion of which is only loosely clamped between said plate and casing, said gasket being of a fibrous material capable of swelling when exposed to water whereby water will be admitted into said gear casing when said gasket is loosely held in a dry condition but prevented from escaping from the gear casing when the gasket swells by absorption of water.

2. In a water sprinkler, a movable water discharge nozzle member, a water chamber communicating with said nozzle member, an impeller wheel mounted in said chamber, water inlet means to said chamber including a nozzle to direct the incoming water against said impeller wheel, a gear casing adjacent said water chamber, a metal partition plate separating said casing from the water chamber, a gasket between said plate and said casing, attaching means for clamping said plate in place only at widely spaced intervals, said gasket being of a fibrous material capable of swelling when exposed to water so as to admit water initially into said gear casing when the gasket is dry but which is prevented from escaping from the casing when the gasket absorbs water, means for transmitting motion from said impeller wheel to said nozzle member including an impeller wheel shaft extending through said plate and across said gear casing and reduction gearing mounted in said casing which includes gears of nylon material and bearings also of nylon material, said gears and bearings being initially loosely fitted so that when they absorb water they will have the desired running fit.

3. In a water sprinkler, the combination defined in claim 2 wherein said plate and gasket are held in place by two screws at opposite corners of the plate.

4. In a water sprinkler, the combination defined in claim 2 wherein said impeller shaft and a worm gear mounted directly on said shaft are of brass, wherein said partition plate and casing wall are of a different metal, and wherein the other parts of said gearing are of nylon material.

References Cited in the file of this patent
UNITED STATES PATENTS

| | | |
|---|---|---|
| 195,215 | Horton | Sept. 18, 1877 |
| 521,814 | Raubold | June 26, 1894 |
| 2,673,122 | Wehner | Mar. 23, 1954 |
| 2,676,842 | Squiers | Apr. 27, 1954 |
| 2,769,665 | Spender | Nov. 6, 1956 |

OTHER REFERENCES

Product Engineering (publication) July 1950, pages 102–107, Nylon in Bearings and Gears.